United States Patent [19]
Potter, Jr.

[11] 3,961,720
[45] June 8, 1976

[54] VACUUM INSULATED CONTAINER
[75] Inventor: Gordon W. Potter, Jr., Nashville, Tenn.
[73] Assignee: Aladdin Industries, Incorporated, Chicago, Ill.
[22] Filed: Oct. 7, 1974
[21] Appl. No.: 512,411

[52] U.S. Cl. ............................................. 215/13 R
[51] Int. Cl.² ................................................. A47J 41/02
[58] Field of Search ............. 215/12 A, 13 R, 13 A; 220/9 C, 9 F, 9 M, 10

[56] References Cited
UNITED STATES PATENTS
| | | | |
|---|---|---|---|
| 990,077 | 4/1911 | Steel | 220/10 |
| 1,909,315 | 5/1933 | Podbielniak | 215/13 X |
| 2,643,021 | 6/1953 | Freedman | 215/13 R X |
| 3,016,159 | 1/1962 | Bramming | 215/13 A |

FOREIGN PATENTS OR APPLICATIONS
| | | | |
|---|---|---|---|
| 848,292 | 7/1939 | France | 215/13 R |
| 573,056 | 3/1933 | Germany | 215/13 R |

*Primary Examiner*—Donald F. Norton
*Attorney, Agent, or Firm*—McDougall, Hersh & Scott

[57] ABSTRACT

A vacuum insulated container is produced by sealing the ends of a pair of hollow concentric tubular members. Air is then evacuated from the enclosed space between the members to obtain a vacuum insulating sleeve. An insulated base seals one end of the sleeve while a liner is provided in the interior of the sleeve for receiving food or a beverage. The other end of the sleeve may have various configurations to provide either a wide or narrow mouthed opening.

16 Claims, 6 Drawing Figures

VACUUM INSULATED CONTAINER

BACKGROUND OF THE INVENTION

The present invention relates to the field of containers for maintaining liquids and solid materials, such as food, at a substantially constant temperature over a relatively long period of time. One highly successful device for accomplishing this objective is a Dewar flask or Thermos bottle. A conventional Thermos bottle employs a double wall filler which may be made of metal, glass, plastic or other suitable material from which air is substantially evacuated.

In a first type of construction the double wall filler is formed in the shape of a cup and is provided with a protective liner on the inside so that in the event the vacuum filler breaks, the food or beverage in the liner will be protected from glass particles and the like. Additionally, the vacuum bottle is generally provided with an outside protective covering to prevent damage to the vacuum filler from accidental tipping, jostling and dropping.

A second type of vacuum thermos construction known in the art utilizes metal for the vacuum filler whereby the need for an outside protective casing is eliminated.

None of the above thermos constructions discloses a construction whereby a simple vacuum sleeve is utilized to form a vacuum insulating container. Such a construction has a number of advantages including lower cost, higher assembly rates and high thermal efficiency, and reduced resistance to breakage. U.S. Pat. No. 1,909,315 discloses a tubular vacuum sleeve through which a distillation column passes. However, there is no teaching of forming a vacuum insulated container nor does it show the use of a lining inside of the vacuum sleeve or disclose the use of a completely sealed and insulated base.

It is accordingly an object of the present invention to provide a vacuum insulated container which is low in cost and minimizes the number of forming operations.

It is another object of the present invention to provide a vacuum insulated container which has a high thermal efficiency.

It is another object of the present invention to produce a vacuum insulated container from a pair of concentric tubular members in which a liner for receiving food or beverage is provided and which has an insulated base at one end thereof and a removable closure at the other end thereof.

It is another object of the present invention to produce a vacuum insulated sleeve which can be utilized to form vacuum insulated containers of various opening configurations such as wide mouth or narrow mouth or convertible between wide and narrow mouth.

Other objects and advantages of the invention will be apparent from the concluding portion of the specification.

DETAILED DESCRIPTION

Figures 1, 2, 2A, 2B:
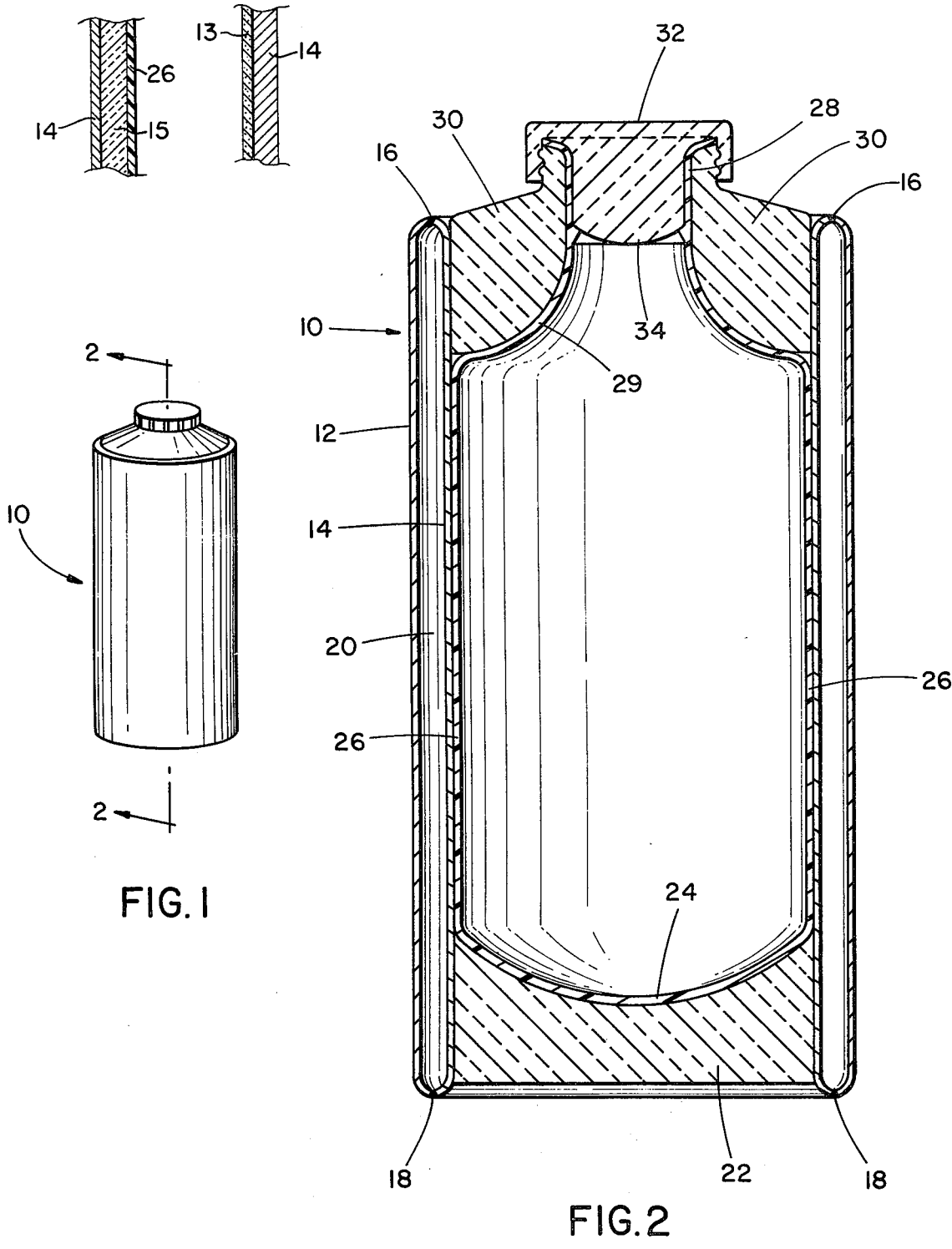
FIG. 1 is a perspective view of a vacuum insulated container according to the present invention.
FIG. 2 is a cross-sectional view along the lines 2—2 of FIG. 1 illustrating the construction details of the invention according to a first embodiment.
FIGS. 2A and 2B are fragmentary views illustrating the liner insulation and the emissivity coating, respectively.

Referring to FIGS. 1 and 2, a vacuum insulated container constructed according to the present invention is illustrated. A double walled hollow sleeve 10 constitutes the vacuum insulating element of the device. This vacuum sleeve is illustrated as being of a cylindrical shape whereby a pair of concentric cylinders 12 and 14 are welded together at their ends 16 and 18 to form a hollow sleeve. As will be apparent, various other concentric tubular shapes could be utilized if desired, as for example, rectangular, tapered or conical sets of concentric members could be utilized to form the double walled sleeve.

The sleeve 10 may be formed from various materials depending upon the particular application to which it will be used. For example, the vacuum sleeve may be formed of stainless steel, glass, plastic or fiberglass reenforced metal foil. In practice, any material that will hold a vacuum may be utilized to form the vacuum sleeve.

The welds 16 and 18 at the ends of the vacuum sleeve may be performed by various methods depending upon the material to be welded, as for example, helium arc welding, brazing, heat sealing of plastics, etc.

Regardless of the materials utilized and the method of sealing the ends thereof, it is necessary to effect removal of as much air as practical from the interior 20 of the vacuum sleeve 10. In this manner, the low heat transfer characteristics of a vacuum are obtained. Removal of air from the interior 20 can be effected by several methods, again, the selection of any particular method being a matter of design choice. For example, a sealable nipple communicating the interior 20 to the outside may be formed in the outer member 12 so that a vacuum may be created by withdrawing air from the interior 20 and then sealing the nipple. Alternatively, air can be withdrawn from the interior 20 by placing the assembled device in a vacuum room and effecting the welds 16 and 18 therein.

A particularly advantageous feature of the present invention is that the cost of producing the vacuum sleeves can be maintained very low in that the production thereof can be automated in the manner practiced by the manufacturing industry.

Regardless of the method utilized for producing and sealing the vacuum sleeve 10, it is desirable to provide the interior surfaces of the member 12 and 14 with a low emissivity coating 13 such as silver in order to reduce the transfer of heat by radiation across the vacuum barrier.

After the vacuum sleeves have been suitably prepared, the lower end of the sleeve assembly is permanently sealed by insertion of an insulating base 22. Base 22 is preferably a non-vacuum insulating material such as foam, cork, fiberglass and the like, adapted to fit into the hollow interior of the sleeve at one end thereof. In the embodiment illustrated in FIG. 2, the base 22 has an upper end which is of a curvilinear design adapted to receive and support the bottom 24 of a liner 26.

The liner 26 is inserted through the opening in the other end of the vacuum sleeve and is preferably formed of an inert plastic material so as to be safe for storing foods and beverages for human consumption. The liner preferably fits snugly against the inner wall 14 of the sleeve and against the base 22. If desired, the liner can be insulated with about an eighth of an inch of insulation 15 wrapped about it to reduce heat convection between the liner and the inner wall of the vacuum sleeve.

In the embodiment illustrated in FIG. 2, the liner 26 is shown as having a narrow mouth opening 28 tapering inwardly from engagement with the wall 14 near the top of the vacuum sleeve. For this embodiment an additional insulating collar 30 is utilized to insulate the neck portion 29 of the liner where it is not flush against the vacuum sleeve. Insulating collar 30 is suitably bonded to the sleeve by adhesive, welding or mechanically as desired to secure the liner in the sleeve. An insulated stopper 32 is threadingly engaged to the insulating collar 30 and has a lower portion 34 which extends into the interior of the liner to effect a seal therewith.

As will be apparent, other liner and stopper designs are possible with the vacuum sleeve according to the present invention. For example, a wide mouth liner could be utilized wherein it passes upwardly along the full length of the vacuum sleeve and does not taper inwardly. A wide mouth stopper is then provided and such a vacuum container is ideally suited for use with foods which must be eaten with a utensil.

Figure 3:
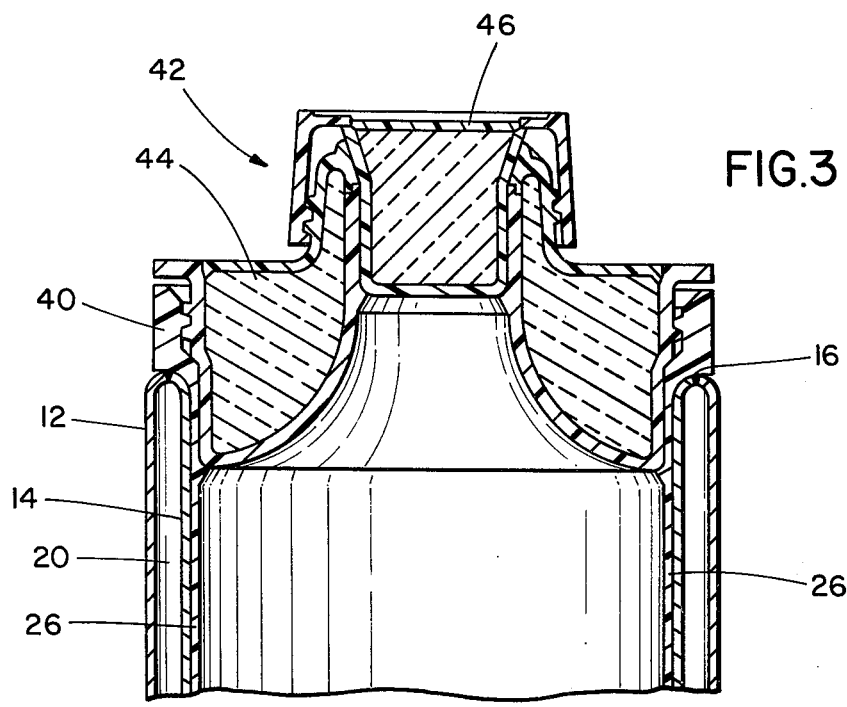
FIG. 3 is a cross-sectional view of the invention according to a modification thereof wherein a convertible stopper is utilized to vary the configuration of the upper portion of the container between a wide mouth and narrow mouth configuration.

Another variation in the design of the interior of the vacuum sleeve is illustrated in FIG. 3 where the present invention is utilized in conjunction with a convertible stopper which permits the selective use of the thermos as either a wide mouth thermos or a narrow mouth Thermos. The convertible stopper is the subject matter of patent application Ser. No. 446,694 and is assigned to the present assignee. The construction details of the convertible stopper are contained in that application and, so far as necessary to an understanding of the present invention, the details therein are hereby incorporated by reference.

An embodiment of the present invention adapted to utilize the convertible stopper has a vacuum sleeve 10 with side walls 12 and 14 as in the FIG. 2 embodiment. The liner, however, does not taper inwardly but extends to a point at or above the upper end of the sleeve 10. The liner 26 is secured to the top of the vacuum sleeve 10 in any suitable manner. For example, it may be threaded thereon with a set of mating threads, spot welded or in other ways known in the art.

Provided on a vertical extension 40 of the liner are a set of internally facing screw threads adapted to receive the convertible stopper 42. The stopper 42 includes a large stopper 44 which threadingly engages the extension 40 to convert the wide mouth configuration of the liner to a narrow mouth configuration. The large stopper is insulated and tapers inwardly from the liner 26 to form a narrow mouth opening. A narrow mouth insulated stopper 46 is provided to sealingly engage the narrow mouth formed by the large stopper 44. The convertible stopper permits use of the container as a wide mouth device by removing and replacing only the large portion 44. Alternatively, if a narrow mouth device is desired, as for example when liquids are being poured, the narrow mouth stopper is removed while the convertible stopper is retained in place.

Figure 4:
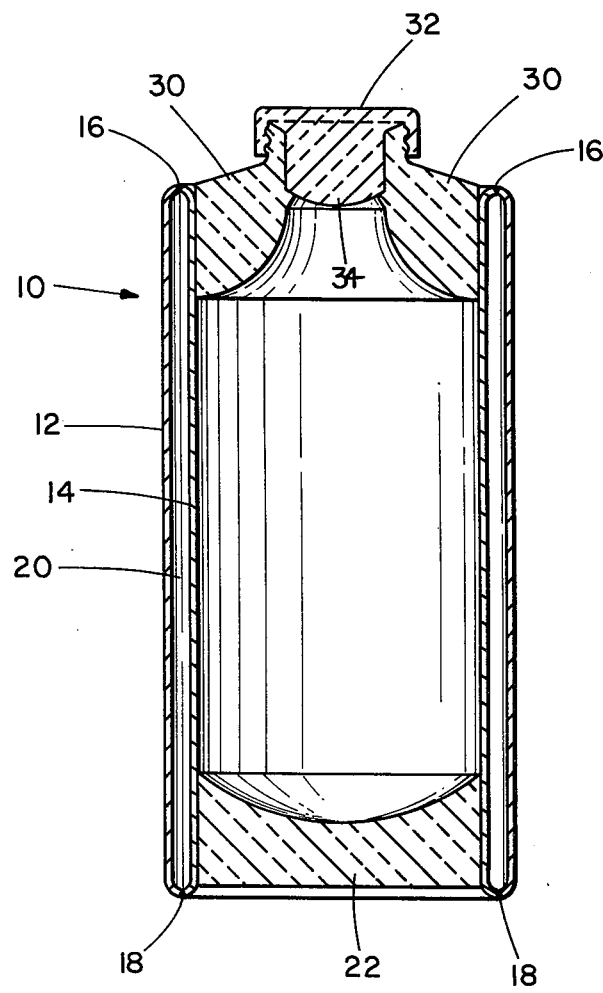
FIG. 4 is a cross-sectional view of a modification of the invention wherein a liner is omitted.

Referring now to FIG. 4, a vacuum container according to a modification of the invention is illustrated. The numbers utilized in this figure are the same as those for FIG. 2. Although the preferred embodiment includes a liner 26, the use of the liner is not essential to obtain the thermal insulating benefits of the present invention. Specific examples of where an unlined container would be satisfactory include containing and transporting dry ice or other material requiring thermal insulation. In this embodiment, the stopper 32 is threaded onto the insulating collar 30 to seal the top end of the container. The bottom end requires no modification inasmuch as the thermal insulating base 22 effects a seal although if desired the curvilinear configuration of the base can be eliminated.

While several constructions for the present invention have been illustrated and discussed, it will be apparent that other accessories can be added to the thermos as for example, a cup can be threadingly engaged over the stoppers on suitable threads provided on either the insulation or the vacuum sleeve.

Vacuum containers constructed according to the present invention possess thermal properties superior to an insulated container utilizing only foam. Such vacuum sleeve containers produce thermal retention results closely rivaling vacuum insulated containers of much costlier design as for example, narrow-necked vacuum bottles.

While I have shown and described embodiments of this invention in some detail, it will be understood that this description and illustrations are offered merely by way of example, and that the invention is to be limited in scope only by the appended claims.

I claim:
1. A thermally insulated container comprising:
   a. a hollow double walled sleeve formed by a pair of concentric tubular members sealed together at their ends to form an airtight chamber therebetween and from which air is substantially evacuated;
   b. a base of thermal insulating material sealingly engaging one end of said sleeve;
   c. a liner secured in the hollow central portion of said sleeve and having an opening at the other end of said sleeve for receiving material to be thermally insulated; and
   d. means for sealing and thermally insulating said opening and the immediately adjacent portions of said liner.

2. The device of claim 1 wherein said sleeve is formed from a pair of concentric hollow cylinders.

3. The device of claim 1 wherein said sleeve is formed of metal and said ends are sealed by welding.

4. The device of claim 1 wherein the surface of said base extending into said sleeve is a curvilinear surface for supporting said liner thereon.

5. The device of claim 1 wherein said liner is formed of non-toxic material to permit food and beverages to be contained therein.

6. The device of claim 1 wherein said liner has insulation provided on its outer surface to reduce heat convection between the liner and the sleeve.

7. The device of claim 1 wherein the interior walls of said sleeve have a low thermal emissivity coating thereon to reduce thermal radiation across the airtight chamber.

8. The device of claim 1 wherein said liner shape conforms to the sleeve and said opening is of substantially the same size as the inside diameter of the sleeve.

9. The device according to claim 8 wherein said means for sealing includes a thermally insulated stopper releasably secured to said opening.

10. The device according to claim 9 wherein said stopper is a compound stopper including:
   a. a large stopper having a smal opening therein for reducing the effective size of the liner opening; and
   b. a small stopper releasably secured to said large stopper for sealing said small opening whereby removal of said stoppers permits use of said container in either a wide or narrow mouthed configuration.

11. The device of claim 1 wherein said liner is tapered at the top so the opening is substantially smaller than the inside diameter of the sleeve.

12. The device according to claim 9 wherein said means for sealing includes:
   a. a thermally insulated stopper releasably secured to said opening; and
   b. a thermally insulated collar secured about said opening at said other end of said sleeve.

13. The device according to claim 1 wherein said means for sealing includes a thermally insulated stopper releasably secured to said opening.

14. A thermally insulated container comprising:
   a. a hollow double walled sleeve formed by a pair of concentric hollow cylinders sealed together at their ends to form an airtight chamber therebetween and from which air is substantially evacuated;
   b. a base of thermal insulating material sealingly engaging one end of said sleeve; and
   c. means for removably sealing and thermally insulating the other end of said sleeve.

15. The device of claim 14 wherein the interior walls of said sleeve have a low thermal emissivity coating thereon to reduce thermal radiation across the airtight chamber.

16. The device of claim 14 wherein said means for removably sealing includes:
   a. a thermally insulated collar having a central opening therein secured about said other end of said sleeve; and
   b. a thermally insulated stopper releasably secured to said opening.

* * * * *